(12) United States Patent
Kamm et al.

(10) Patent No.: US 7,527,576 B2
(45) Date of Patent: May 5, 2009

(54) MULTI-STEP TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 196 days.

(21) Appl. No.: 11/803,263

(22) Filed: May 14, 2007

(65) Prior Publication Data

US 2007/0281820 A1 Dec. 6, 2007

(30) Foreign Application Priority Data

Jun. 1, 2006 (DE) .................. 10 2006 025 554

(51) Int. Cl.
*F16H 3/44* (2006.01)
*F16H 3/62* (2006.01)
(52) U.S. Cl. ................... 475/284; 475/278; 475/325
(58) Field of Classification Search ......... 475/275–292, 475/325
See application file for complete search history.

(56) References Cited

U.S. PATENT DOCUMENTS

| | | | |
|---|---|---|---|
| 6,176,803 B1 | 1/2001 | Meyer et al. | |
| 6,634,980 B1 | 10/2003 | Ziemer | |
| 6,960,149 B2 | 11/2005 | Ziemer | |
| 7,014,589 B2 | 3/2006 | Stevenson | |
| 7,018,319 B2 | 3/2006 | Ziemer | |
| 2006/0270514 A1* | 11/2006 | Oguri et al. | 475/275 |
| 2008/0171629 A1* | 7/2008 | Hart et al. | 475/276 |
| 2008/0300093 A1* | 12/2008 | Borgerson | 475/276 |

FOREIGN PATENT DOCUMENTS

| | | |
|---|---|---|
| DE | 42 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 10 2005 032 001 A1 | 2/2007 |

\* cited by examiner

*Primary Examiner*—Roger Pang
(74) *Attorney, Agent, or Firm*—Davis & Bujold, P.L.L.C.

(57) ABSTRACT

A transmission includes planetary gearsets, shafts and shifting elements. A carrier of gearset (RS4) and the input shaft couple forming shaft (1). A carrier of gearset (RS3) and the output shaft couple forming shaft (2). A sun gear of gearsets (RS1, RS4) couple forming shaft (3). The carriers of gearsets (RS1, RS2) respectively form shafts (4, 8). A ring gear of gearset (RS2) and a sun gear of gearset (RS3) couple forming shaft (5). A ring gear of gearsets (RS1, RS3) couple forming shaft (6). A sun gear of gearset (RS2) and a ring gear of gearset (RS4) couple forming shaft (7). Element (A) is located in a direction of power flow between shaft (3) and the transmission housing, element (B) between shaft (4) and the housing, element (C) between shafts (1, 5), element (D) between shafts (2, 6) or (6, 8), element (E) between two of shafts (5, 7, 8).

33 Claims, 10 Drawing Sheets

| Gear | Engaged Shifting Elements ||||| Ratio i | Step φ |
|---|---|---|---|---|---|---|---|
| | Brake || Clutch |||||
| | A | B | C | D | E | | |
| 1 | ● | ● | ● | | | 4.70 | |
| 2 | ● | ● | | | ● | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.28 | 1.30 |
| 6 | | | ● | ● | ● | 1.00 | 1.28 |
| 7 | ● | | ● | ● | | 0.84 | 1.19 |
| 8 | ● | | | ● | ● | 0.67 | 1.27 |
| R | ● | ● | | ● | | -3.53 | TOTAL 7.05 |

| Gear | Engaged Shifting Elements ||||| Ratio i | Step φ |
|---|---|---|---|---|---|---|---|
| | Brake || Clutch ||| | |
| | A | B | C | D | E | | |
| 1 | ● | ● | ● | | | 4.70 | |
| 2 | ● | ● | | | | 3.13 | 1.50 |
| 3 | | ● | ● | | ● | 2.10 | 1.49 |
| 4 | | ● | | ● | ● | 1.67 | 1.26 |
| 5 | | ● | ● | ● | | 1.24 | 1.34 |
| 6 | | | ● | ● | ● | 1.00 | 1.24 |
| 7 | ● | | ● | ● | | 0.87 | 1.15 |
| 8 | ● | | | ● | ● | 0.67 | 1.30 |
| R | ● | ● | | ● | | -4.86 | TOTAL 7.05 |

AN, AB, 1, 2, 3, 4, 5, 6, 7, 8, 66

MULTI-STEP TRANSMISSION

This application claims priority from German Application Serial No. DE 10 2006 025 554.2 filed Jun. 1, 2006.

FIELD OF THE INVENTION

The present invention relates to a multi-step transmission in planetary construction, in particular an automatic transmission for a motor vehicle comprising an input shaft, an output shaft, four planetary gearsets, at least eight rotatable shafts and five shifting elements, whose selective engagement creates different transmission ratios between input and output shaft, so that eight forward gears and at least one reverse gear can be implemented.

BACKGROUND OF THE INVENTION

In the state of the art, automatic transmissions, particularly for motor vehicles, comprise planetary gearsets that are shifted by means of friction elements or, as the case may be, shifting elements, such as clutches and brakes, and are usually provided with a starting unit that is subject to a slip effect and optionally provided with a converter lockup clutch, such as a hydrodynamic torque converter or a fluid coupling.

In the Applicant's DE 101 15 983 A1, for example, a multi-step transmission is described that has an input shaft that is connected to an upstream shifting set, an output shaft that is connected to a downstream shifting set, and a maximum of seven shifting elements that can be selectively engaged to create at least seven forward gears without range shifting. The upstream shifting set consists of a shiftable or non-shiftable planetary gearset or a maximum of two non-shiftable planetary gearsets that are connected to each other. The downstream shifting set is configured as a two-carrier, four-shaft transmission with two shiftable planetary gearsets and has four free shafts. The first free shaft of this two-carrier, four-shaft transmission is connected to the first shifting element, the second free shaft to the second and third shifting element, the third free shaft with the fourth and fifth shifting element, and the fourth free shaft is connected to the output shaft. For a multi-step transmission with a total of six shifting elements, the invention proposes that the third free shaft or the first free shaft of the downstream shifting set be additionally connected to a sixth shifting element. For a multi-step transmission with a total of seven shifting elements, the invention proposes that the third free shaft be additionally connected to the sixth shifting element, and the first free shaft additionally connected to a seventh shifting element.

Several other multi-step transmissions are known, for example from the applicant's DE 101 15 995 A1, which discloses four shiftable planetary gearsets that are connected to each other, and six or seven fictional shifting elements, through whose selective locking, a rotational speed of an input shaft of the transmission can be transmitted in such a way to the output shaft of the transmission that nine or eleven forward gears and at least one reverse gear can be implemented. Depending on the gearbox diagram, two or three shifting elements are engaged in each gear, whereby during shifting from one gear into the next following higher gear or the next following lower gear, only one engaged shifting element is disengaged and a previously disengaged shifting element is engaged respectively in order to avoid range shifting.

In addition, the Applicant's generic, previously unpublished patent application DE 10 2005 002 337.1 proposes a multi-step transmission with an input shaft, an output shaft, four individual planetary gearsets that are connected with each other, and five shifting elements in which eight forward gears can be realized without range shifting, i.e., in such a way that when changing from a forward gear into the next following higher or lower forward gear, only one of the previously engaged shifting elements is disengaged, and only one of the previously disengaged shifting elements is engaged. The multi-step transmission also discloses one reverse gear. In all forward gears and in the reverse gear, three shifting elements are engaged respectively. Regarding the kinematic coupling of the four planetary gears sets to each other and to the input and output shaft, it is provided that one carrier of the fourth planetary gearset and the input gear are connected to each other and form a first shaft of the transmission; a carrier of the third planetary gearset and the output shaft are connected to each other and form a second shaft of the transmission; a sun gear of the first planetary gearset and a sun gear of the fourth planetary gearset are connected to each other and form a third shaft of the transmission; a ring gear of the first planetary gearset forms a fourth shaft of the transmission; a ring gear of the second planetary gearset and a sun gear of the third planetary gearset are connected to each other and form a fifth shaft of the transmission; a carrier of the first planetary gearset and a ring gear of the third planetary gearset are connected to each other and form a sixth shaft of the transmission; a sun gear of the second planetary gearset and a ring gear of the fourth planetary gearset are connected to each other and form a seventh shaft of the transmission; and a carrier of the second planetary gearset forms an eighth shaft of the transmission. Relating to the kinematic coupling of the five shifting elements to the four planetary gearsets and to an input and output shaft, it is provided that the first shifting element is arranged in the direction of power between the third shaft and a housing of the transmission, the second shifting element between the fourth shaft and a housing of the transmission, the third shifting element between the first and fifth shafts, the fourth shifting element either between the eighth and second shafts or between the eighth and sixth shafts, as well as the fifth shifting element either between the seventh and fifth shafts or between the seventh and eighth or between the fifth and eighth shafts.

Automatically shiftable motor vehicle transmissions in planetary construction have, therefore, in general, been described many times in the state of the art and are subject to continuous further development and improvement. These transmissions should, therefore, have a sufficient number of forward gears and one reverse gear and a transmission ratio that is very well suited to motor vehicles that have a high total ratio spread and favorable gear steps. In addition, they should allow a high starting ratio in a forward direction, contain a direct gear, and be suitable for use in both private and commercial vehicles. In addition, these transmissions should need only simple construction, in particular a small number of shifting elements, and should avoid double shifts by means of a sequential shift mode, so that only one shifting element is changed during shifting within defined gear ranges.

The present invention is based on the task of proposing a multi-step transmission of the type cited above that has at least eight forward gears that are free of range-shifting and at least one reverse gear which, by using a total of four planetary gearsets, requires the smallest possible number of shifting elements. In addition, the transmission should have a large spread with comparatively harmonic gear-stepping and, at least in the main drive gears, a favorable degree of efficiency, i.e., relatively low drag or cogging losses.

SUMMARY OF THE INVENTION

The inventive multi-step transmission in planetary construction is based on the gearbox diagram in the applicant's generic patent application DE 10 2005 002 337.1 and discloses an input shaft, an output shaft, four interconnected planetary gearsets, at least eight rotatable shafts, and five shifting elements (two brakes and three clutches), whose elective engagement produces different transmission ratios between the input shaft and the output shaft, so that eight forward gears and one reverse gear can be implemented. In each gear respectively, three of the five shifting elements are engaged, whereby, when shifting from a forward gear into the next following higher or lower forward gear, only one of the previously engaged shifting elements is disengaged in each case, and only one of the previously disengaged shifting elements is engaged.

It is inventively proposed that:
one carrier of the fourth planetary gearset and the input shaft are permanently connected and form the first shaft of the transmission;
one carrier of the third planetary gearset and the output shaft are permanently connected and form the second shaft of the transmission;
a sun gear of the first planetary gearset and a sun gear of the fourth planetary gearset are permanently connected and form the third shaft of the transmission;
a carrier of the first planetary gearset forms the fourth shaft of the transmission;
a ring gear of the second planetary gearset and a sun gear of the third planetary gearset are permanently connected and form the fifth shaft of the transmission;
a ring gear of the first planetary gearset and a ring gear of the third planetary gearset are permanently connected and form the sixth shaft of the transmission;
a sun gear of the second planetary gearset and a ring gear of the fourth planetary gearset are permanently connected and form the seventh shaft of the transmission;
a carrier of the second planetary gearset forms the eighth shaft of the transmission;
the first shifting element is arranged in direction of power flow between the third shaft and a housing of the transmission;
the second shifting element is arranged in direction of power flow between the fourth shaft and the housing of the transmission;
the third shifting element is arranged in direction of power flow between the first and fifth shaft of the transmission;
the fourth shifting element is arranged in direction of power flow, either between the second and eight shaft or between the sixth and eighth shaft of the transmission, and
the fifth shifting element is arranged in direction of power flow between the fifth and the seventh shaft or between the fifth and eighth shaft or between the seventh and eighth shafts of the transmission.

The inventive multi-step transmission is thus different from the generic multi-step transmission of DE 10 2005 002 337.1 in that the fourth shaft of the transmission is formed by the carrier of the first planetary gearset, and that the ring gears of the first and third planetary gearsets are now permanently connected to form the sixth shaft of the transmission.

As in the generic multi-step transmission according to DE 10 2005 002 337.1, it is also the case in the inventive multi-step transmission, that the first forward gear is produced by engaging the first, second, and third shifting elements; the second forward gear by engaging the first, second and fifth shifting elements; the third forward gear by engaging the second, third, and fifth shifting elements; the fourth forward gear by engaging the second, fourth, and fifth shifting elements; the fifth forward gear by engaging the second, third and fourth shifting elements; the sixth forward gear by engaging the third, fourth, and fifth shifting elements; the seventh forward gear by engaging the first, third, and fourth shifting elements; the eighth forward gear by engaging the first, fourth, and fifth shifting elements; and the reverse gear by engaging the first, second, and fourth shifting elements.

Three of the four planetary gearsets are configured as so-called negative-planetary gearsets whose respective planetary gears mesh with the sun gear and ring gear of the respective planetary gearset. One of the four planetary gearsets—especially the first planetary gearset—is configured as a so-called positive-planetary gearset with meshing inner and outer planetary gears, whereby the inner planetary gears also mesh with the sun gear of this positive-planetary gearset, and whereby the outer planetary gears also mesh with the ring gear of this positive-planetary gearset. Regarding the spatial arrangement of the four planetary gearsets in the housing of the transmission, it is proposed, in an advantageous embodiment, that the four planetary gearsets be arranged co-axially parallel to each other in the order "first, fourth, second, third planetary gearset."

The spatial arrangement of the shifting elements of the inventive multi-step transmission inside the transmission housing is, in principle, limited only by the dimensions and the external form of the transmission housing. Numerous suggestions regarding the spatial arrangement and the constructive design of the shifting elements can be seen, for example, in the generic patent application DE 10 2005 002 337.1.

In an embodiment that is advantageous for a manual transmission, the shifting elements can be arranged, for example, in spatial terms, so that the first and the second shifting elements are arranged at least partially in an area radially above the first or fourth planetary gearset. The third and fifth shifting elements can be arranged, for example, in spatial terms, at least partially in an area axially between the second and third planetary gearsets, whereby the fifth element provided to lock the second planetary gearset is preferably immediately axially adjacent to the second planetary gearset. The fifth shifting element can, however, also be arranged on the side of the secondary planetary gearset facing away from the third planetary gearset, that is, in an area axially between the second and fourth planetary gearsets, then too preferably immediately axially adjacent to the second planetary gearset. In spatial terms, the fourth shifting element can be arranged at least partially in an area axially between the second and third planetary gearsets or also, in spatial terms, at least partially in an area axially between the fourth and second planetary gearsets. The disc pack of the fourth shifting element can, for example, be arranged adjacent to the third planetary gearset or adjacent to the second planetary gearset.

Suitable transmission ratios with a large total ratio spread in harmonic gear-stops are produced, particularly for private motor vehicles, by means of the inventive embodiment of the multi-step transmission. In addition, with the inventive multi-step transmission, construction is comparatively simple due to the low number of shifting elements, i.e., two brakes and three clutches. What is more, there is a good degree of efficiency in all gears with the inventive multi-step transmission, on the one hand, due to low drag loss, as only two shifting elements are not in contact in each gear, and on the other hand, also as a result of low engaging losses in the simply constructed individual planetary gearsets.

In addition, with the inventive multi-step transmission, starting is also advantageously possible using a hydrodynamic converter, an external starting clutch, or also with other suitable external starting elements. It is also conceivable to enable the starting process by means of a starting element that is integrated into the transmission. One of the two brakes that are activated in the first and second forward gears and in the reverse gear is advantageously suited for this purpose.

In addition, the inventive multi-step transmission is conceived in such a way that adaptability to various drive train embodiments is possible with respect to both force-flow direction and spatial considerations. It is possible, for example, without special constructive measures, to optionally arrange the transmission input and output co-axially or axially parallel.

For use with input and output shafts that run co-axially to each other, it is, for example, useful for the first planetary gearset to be the planetary gearset of the inventive planetary gear-set group that faces the transmission drive. For an application with input and output shafts that run axially parallel or at an angle to each other, the first or the third planetary gearset can be arranged on the side of the transmission housing closest the drive motor that is functionally connected to the input shaft.

In connection with the proposed spatial arrangement of the four planetary gearsets as co-axially parallel in the order of "first, fourth, second, third planetary gearsets," and the proposed spatial arrangement of the five shifting elements inside the transmission housing, it is possible, in a constructively advantageous manner, for no more than one shaft respectively of the transmission to pass through the center of a maximum of three of the four planetary gearsets. The constructive configuration of the pressurizing medium and lubricant supply to the servos of the individual shifting elements is correspondingly simple. In connection with input and output shafts that run co-axially parallel to each other, for example, only the first shaft of the transmission passes through the center of the first, fourth, and secondary planetary gearset. In connection with input and outputs shafts that run axially parallel or at an angle to each other and a first planetary gearset near the drive motor, for example, only the first shaft of the transmission passes through the center of the first, fourth, and secondary planetary gearset. In connection with input and output shafts that run axially parallel or at an angle to each other and a third planetary gearset near the drive motor, it can be provided, for example, that only one shaft of the transmission, the first shaft of the transmission, passes through the center of only the third and second planetary gearsets.

In all cases, the third shaft of the transmission, sections of which are formed by the sun gears of the first and fourth planetary gearsets, can be pivoted on a hub affixed to the housing. If the first planetary gearset faces the transmission drive, the aforementioned hub, which is affixed to the housing, is part of the drive-side transmission housing; otherwise it is part of the transmission housing wall opposite the drive motor.

BRIEF DESCRIPTION OF THE DRAWINGS

The invention will now be described, by way of example, with reference to the accompanying drawings in which comparable components are given the same reference symbols. The following are shown:

FIG. 4 is an exemplary shift pattern and exemplary gear ratios for the multi-step transmission according to FIGS. 1, 2, and 3;

FIG. 8 is an exemplary shift pattern and exemplary gear ratios for the multi-step transmission according to FIGS. 5, 6, and 7;

DETAILED DESCRIPTION OF THE INVENTION

Figure 1:
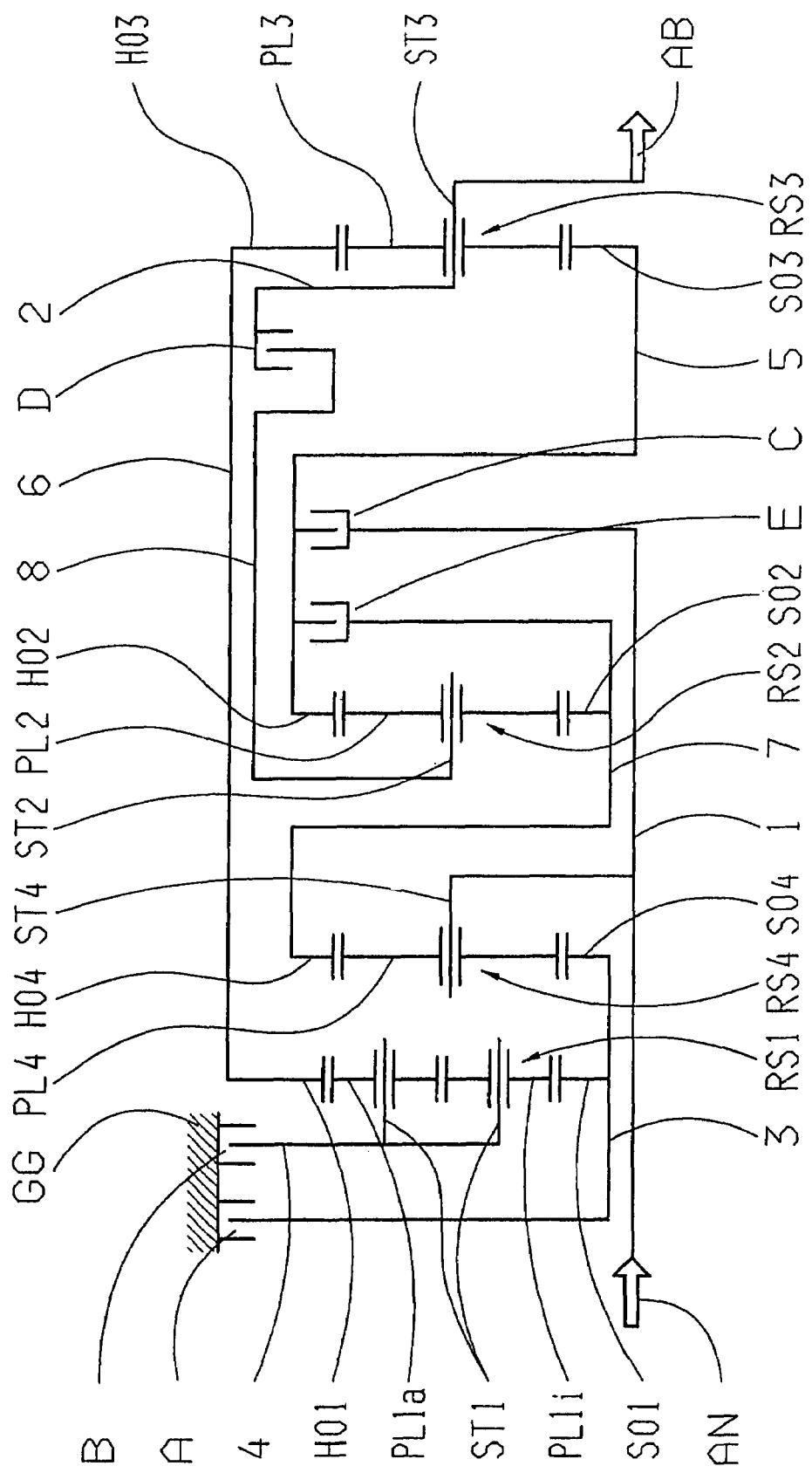
FIG. 1 is a schematic presentation of a first embodiment of a multi-step transmission according to the invention.

FIG. 1 now shows a first embodiment of a multi-step transmission according to the invention, in a schematic presentation. The transmission comprises an input shaft AN and an output shaft AB, as well as four planetary gearsets RS1, RS2, RS3, RS4, and five shifting elements A, B, C, D, E, which are all arranged in a housing GG of the transmission. In this embodiment, the four planetary gearsets RS1, RS2, RS3, RS4, are arranged co-axially in a row in an axial direction in the order "RS1, RS4, RS2, RS3." The planetary gearset RS1 is configured as a simple positive-planetary gearset in double planetary construction. As is generally known, a positive-planetary gearset has meshing inner and outer planetary gears, whereby these inner planetary gears also mesh with the sun gear of the planetary set, and whereby the outer planetary gears also mesh with the ring gear of the planetary gearset. The ring gear of the planetary gearset RS1 is marked with HO1, a sun gear with SO1, an inner planetary gears with PL1*i*, a outer planetary gears with PL1*a*; the carrier on which the inner and outer planetary gears PL1*i*, PL1*a* are rotatably disposed, with ST1. The other three planetary gearsets RS2, RS3, and RS4 are configured as simple negative-planetary gearsets. As is generally known, a negative-planetary gearset features planetary gears that mesh with the sun and ring gears of this planetary set. The ring gears of the planetary gearsets RS2, RS3, RS4 are marked with HO2, HO3, and HO4; sun gears with SO2, SO3, and SO4; planetary gears with PL2, PL3, and PL4, and the carriers on which the planetary gears are rotatably disposed are marked with ST2, ST3 and ST4.

Of course, the gearing of the planetary gearsets of the transmission can be configured as helical gearing, whereby the person skilled in the art will construe the helix angle, the gearing flank corrections and the direction of the helix in the usual manner, taking into consideration the gearing forces present on the respective gearing and the axial bearing concept of the transmission. In that way, in the embodiment shown in FIG. 1, an advantageous embodiment could, for example, be that ring gear HO1 of the first planetary gearset RS1 (configured as a positive-planetary gearset) having so-called left-rising helical gearing, while the ring gears HO4, HO2, HO3 of the other three planetary gearsets RS4, RS2, RS3 (all configured as negative-planetary gearsets), could have so-called right-rising helical gearing. On the other hand, in the transmission according to FIG. 4 of the generically similar DE 10 2005 002 337.1, which has a construction that is comparatively similar to that of the present FIG. 1, there are several useful embodiments of the helical gearing of the planetary gear-set gearing: the ring gears of all four (negative-) planetary gearsets, which, like the present example, are arranged axially parallel in the order "RS1, RS4, RS2, RS3", preferably display right-rising helical gearing respectively. In a second-best solution, the ring gears of the first, fourth, and third planetary gearsets each display right-rising helical gearing, while the ring gear of the second planetary gearset displays left-rising helical gearing. In a third-best solution, the ring gears of the first, fourth, and second planetary gearsets each display right-rising helical gearing, while the ring gear of the third planetary gearset displays a left-rising helical gearing.

As can also be seen in FIG. 1, the shifting elements A and B are configured as brakes which, in the embodiment presented, are both configured as friction-tight, shiftable, multi-disc brakes, and could, of course in another embodiment, also be configured as friction-tight, shiftable, band brakes or, for example, also as friction-tight, shiftable, claw or conical brakes. The shifting elements C, D and E are configured as clutches which, in the embodiment presented, are all configured as friction-tight, shiftable, multi-disc clutches, but could, of course, in another embodiment, also be configured as form-locking, shiftable, claw or conical brakes. With these five shifting elements A to E, selective shifting of eight forward gears and at least one reverse gear can be implemented. The inventive multi-step transmission features at least eight rotatable shafts, are marked 1 through 8.

Regarding the kinematic coupling of the individual elements of the four planetary gearsets RS1, RS2, RS3, RS4 to each other and to the input and output shafts AN, AB, the invention provides for the following. The carrier ST4 of the fourth planetary gearset RS4 and the input shaft AN are permanently connected as shaft 1. The carrier ST3 of the third planetary gearset RS3 and the output shaft AB are permanently connected as shaft 2. The sun gears SO1, SO4 of the first and fourth planetary gearsets RS1, RS4 are permanently connected as shaft 3. The coupled carrier ST1 of the first planetary gearset RS1 forms the shaft 4. The ring gear HO2 of the second planetary gearset RS2 and the sun gear SO3 of the third planetary gearset RS3 are permanently connected as shaft 5. The ring gear HO1 of the first planetary gearset RS1 and the ring gear HO3 of the third planetary gearset RS3 are permanently connected as shaft 6. The sun gear SO2 of the second planetary gearset RS2 and the ring gear HO4 of the fourth planetary gearset RS4 are permanently connected as shaft 7. The carrier ST2 of the second planetary gearset RS2 forms shaft 8.

With regard to the kinematic coupling of the five shifting elements A to E to the so described shafts 1 to 8 of the transmission, the multi-step transmission according to FIG. 1 provides for the following. The brake A as a first shifting element is arranged in the direction of power flow between the shaft 3 and a housing GG of the transmission. The brake B as second shifting element is arranged in the direction of power flow between the shaft 4 and the housing GG. The clutch C as third shifting element is arranged in the direction of power flow between the shaft 1 and the shaft 5. The clutch D as a fourth shifting element is arranged in the direction of power flow between the shaft 2 and the shaft 8. The clutch E as fifth shifting element is arranged in the direction of power flow between the shaft 5 and the shaft 7 and in an engaged state connects the sun gear SO2 and the ring gear HO2 of the second planetary gearset RS2.

In principle, the spatial arrangement inside the housing of the shifting elements of the embodiment of the inventive multi-step transmission shown in FIG. 1 is optional and will be limited only by the dimensions and the external form of the transmission housing GG.

In the embodiment shown in FIG. 1, the first planetary gearset RS1 is the gearset of the transmission closest the input, and the third planetary gearset RS3 is the gearset closest the output of the transmission, whereby the drive shaft AN and the output shaft AB are, for example, arranged co-axially to each other. It is apparent to the person skilled in the art that this transmission can be modified without great effort, so that the input and output shaft are no longer arranged co-axially to each other, for example, axially parallel or at an angle to each other. With this kind of arrangement, the person skilled in the art will, if needed, also arrange the input of the transmission closest the third planetary gearset RS3, that is, on the side of the third planetary gearset RS3 further from the first planetary gearset RS1.

In principle, the spatial arrangement inside the housing of the shifting elements of the embodiment of the inventive multi-step transmission, shown in FIG. 1, is optional and will be limited only by the dimensions and the external form of the transmission housing GG.

In the embodiment shown in FIG. 1, the two brakes A, B, in spatial terms, are arranged in the area of the first planetary gearset RS1, which is here near the input, in this case axially parallel, whereby the kinematic connection of the two brakes A, B to the first planetary gearset RS1 requires that the brake B be closer to fourth planetary gearset RS4, which is adjacent to the first planetary gearset RS1, than the brake A, or, as the case may be, that the brake A is arranged closer to the input of the transmission than the brake B. In spatial terms, the brake B is arranged at least partially in an area radially above the first planetary gearset RS1, and the brake A, correspondingly, on the side of the first planetary gearset RS1 further (near the drive) from the fourth planetary gearset RS4. An inner disc carrier of the brake A forms a section of the shaft 3 of the transmission and is connected in a rotationally fixed manner with the sun gear SO1 of the first planetary gearset RS1 on the side of the first planetary gearset RS1 further from the fourth planetary gearset RS4. In sections, the shaft 3 is formed as a kind of sun shaft that connects the sun gears SO1, SO4 of the planetary gearsets RS1, RS4 to each other. In this case, the shaft 3 can be rotationally supported either on the drive shaft AN or a hub affixed to the transmission housing (not shown in detail in FIG. 1). An inner disc carrier of the brake B is connected in a rotationally fixed manner as shaft 4 of the transmission, with the coupled carrier ST1 of the first planetary gearset RS1. The servo devices needed to activate the friction elements of the two brakes A, B are, for the purpose of simplification (not shown in more detail in FIG. 1) and can, for example, be integrated into the transmission housing GG or a housing cover that is affixed to the transmission housing or, as the case may be, fitted as axially slidable.

The person skilled in the art will be able to modify this exemplary spatial arrangement of the two brakes A, B, if needed, without particular inventive effort. The brake A, for example, could also be arranged at least partially radially above the first planetary gearset RS1 and the brake B at least partially radially above the fourth planetary gearset RS4. In yet another embodiment, the two brakes A, B could, for example, also be arranged radially one above the other axially adjacent to the first planetary gearset RS1, on the side of the gearset further from the fourth planetary gearset RS4, where the brake B is then, for example, arranged on a larger diameter than the brake A.

As can also be seen from FIG. 1, all three clutches C, D, E are in spatial terms arranged at least partially in an area axially between the second and third planetary gearsets RS2, RS3, where the servos, necessary for activating the respective disc sets of the clutches C, D, E, are for the purpose of simplification (not shown in FIG. 1).

Axially, the clutch E is immediately adjacent to the second planetary gearset RS2. An outer disc carrier of the clutch E thereby forms a section of the shaft 5 of the transmission and is, on the one hand, connected in a rotationally fixed manner with the ring gear HO2 of the second planetary gearset RS2 on its side closest the second planetary gearset RS2 and, on the other hand, on its side further from the second planetary gearset RS2 (via an outer disc carrier of the adjacent clutch C) with the sun gear SO3 of the planetary gearset RS3. An inner disc carrier of the clutch E forms a section of the shaft 7 of the transmission and is connected in a rotationally fixed manner to the sun gear SO2 of the second planetary gearset RS2 which, in turn, is permanently and connected in a rotationally fixed manner with the ring gear HO4 of the fourth planetary gearset RS4. The servo necessary for activation of the disc pack of the clutch E can, for example, be axially displacably supported on the aforementioned inner disc carrier of the clutch E and then constantly rotates with the rotational speed of the shaft 7. However, it can also be provided that the servo of the clutch E is arranged inside the cylinder space formed by the outer disc carrier of the clutch E; that the servo of the clutch E is axially displacably supported on this outer disc carrier of the clutch E and then rotates constantly with the rotational speed of the shaft 5. In order to compensate for the rotational pressure of its rotating pressure chamber, the servo of the clutch E can display dynamic pressure compensation in the known manner.

As can also be seen from FIG. 1, the clutch C is axially adjacent the side of the clutch E further from the second planetary gearset RS2 and faces the third planetary gearset RS3. The outer disc carrier of the clutch C thereby forms a section of the shaft 5 of the transmission and is connected in a rotationally fixed manner, on the one hand, on its side closest the second planetary gearset RS2 (via the outer disc carrier of the clutch E) with the ring gear HO2 of the second planetary gearset RS2 and, on the other hand, on its side further from the second planetary gearset RS2 with the sun gear SO3 of the third planetary gearset RS3. An inner disc carrier of the clutch C forms a section of the shaft 1 of the transmission and is connected in a rotationally fixed manner to the carrier ST4 of the fourth planetary gearset RS4 and with the input shaft AN. The servo necessary for activating the disc set of clutch C can, for example, be axially displacably supported on the inner disc carrier of the clutch C and then constantly rotates at the rotational speed of the shaft 1 or, as the case may be, the input shaft AN. However, it can also be provided that the servo of the clutch C is arranged inside the cylinder space formed by the outer disc carrier of the clutch C, that the servo of the clutch C is axially displacably supported on this outer disc carrier of the clutch C and then constantly rotates with the rotational speed of the shaft 5. In order to compensate for the rotational pressure of its rotating pressure chamber, the servo of the clutch C can display dynamic pressure compensation in a known manner.

As an embodiment favorable for the use of non-variable parts, it is provided, for example, that the disc sets of the two adjacent clutches C, E are arranged on the same diameter. In terms of construction technology, it can also be advantageous to provide a common, one-piece, outer disc carrier for the two adjacent clutches C, E.

In a constructive embodiment that differs from FIG. 1, it can also, for example, be provided in spatial terms that the disc sets of the two clutches C, E are arranged radially one above the other. In this case, if the disc set of the clutch E is in spatial terms at least partially arranged radially above the disc set of the clutch C, a common disc carrier for the two clutches C, E can advantageously be configured as an inner disc carrier for the (radially outer) clutch E and as an outer disc carrier for the (radially inner) clutch C, and connected, on the side of the two clutches C, E closest the third planetary gearset RS3, with the coupling shaft that connects the ring gear HO2 and the sun gear SO3. On the other hand, if the disc set of the clutch C is in spatial terms at least partially arranged radially above the disc set of the clutch E, a common disc carrier for the two clutches C, E can advantageously be configured as an inner disc carrier for the (radially outer) clutch C and as an outer disc carrier for the (radially inner) clutch E and connected, on the side of the two clutches C, E closest the second planetary gearset RS2, with the coupling shaft that connects the ring gear HO2 and the sun gear SO3.

As can also be seen from FIG. 1, the clutch D, in spatial terms, is adjacent to the third planetary gearset RS3. An inner disc carrier of the clutch D thereby forms a section of the shaft 8 of the transmission and is connected in a rotationally fixed manner with the carrier ST2 of the former on the side of the second third planetary gearset RS2 closest the fourth third planetary gearset RS4. The shaft 8 thereby completely overlaps the second planetary gearset RS2 and the two clutches C, E in an axial direction. An outer disc carrier of the clutch D forms a section of the shaft 2 of the transmission and is connected in a rotationally fixed manner to the carrier ST3 of the third planetary gearset RS3 on the side of the disc set of the clutch D closest the third planetary gearset RS3, where this carrier ST3 is, in turn, connected with the output shaft AB of the transmission. The servo necessary for activating the disc pack of the clutch D can be arranged, for example, inside the cylinder space that is formed by the outer disc carrier of the clutch D or, as the case may be, by the shaft 2, can be axially displacably supported on the outer disc set of the clutch D or, as the case may be, on the shaft 2 and then rotates constantly at the rotational speed of this shaft 2. It can also be provided, however, that the servo of the clutch D is axially displacably supported on the above mentioned inner disc carrier of the clutch D or, as the case may be, on the shaft 8 and rotates constantly at the rotational speed of the shaft 8, where in this case, the pressure chamber of the servo of the clutch D can be arranged, for example, near the disc set of the clutch D or, as the case may be, near the third planetary gearset RS3 but, for example, also near the second planetary gearset RS2 in an area axially between the second and fourth planetary gearsets RS2, RS4, and also, for example, even in an area axially between the fourth and first planetary gearsets RS4, RS1. In order to compensate for the rotatory pressure of the rotating pressure chamber, the servo of the clutch D can display dynamic pressure compensation in a known manner.

For the person skilled in the art, it is obvious that the spatial arrangement of the clutch D, inside the transmission housing GG, can be comparatively simply modified relative to the embodiment shown in FIG. 1. It can, therefore, be provided, in an embodiment deviating from FIG. 1, that the disc set of the clutch D, in spatial terms, is arranged in an area radially above the disc sets of the two other clutches C, E. In a further embodiment, the clutch D can, for example, be at least partially arranged in an area radially above the second planetary gearset RS2, whereby a section of the shaft 2 then at least largely overlaps the two clutches C, E in an axial direction. In a further embodiment, it can also be provided, for example, that the clutch D, in spatial terms, is arranged in an area axially between the second and fourth planetary gearsets RS2, RS4, where a section of the shaft 2 then overlaps the two clutches C, E completely in an axial direction and the second planetary gearset RS2 at least partially in an axial direction.

As can also be seen from FIG. 1, the shaft 6, as a coupling shaft between the two ring gears HO1, HO3 of the first and third planetary gearsets RS1, RS3, completely overlaps in their axial extent the fourth and second planetary gearsets RS4, RS2, as well as the clutches E, C, D.

It is expressly pointed out that the arrangement of the three clutches C, D, E, described above is only to be considered as an example. If needed, the person skilled in the art will also modify this exemplary spatial arrangement of the three clutches C, D, E. Numerous suggestions for this are, for example, seen in the generic patent application DE 10 2005 002 337.1. For example, it can be provided—without essentially changing the component structure of the transmission shown in FIG. 1—for the disc set of the clutch E to be arranged at least partially, in spatial terms, radially above the disc set of the clutch C so that the clutch E, in spatial terms, is arranged at least partially above the clutch C.

Figure 2:
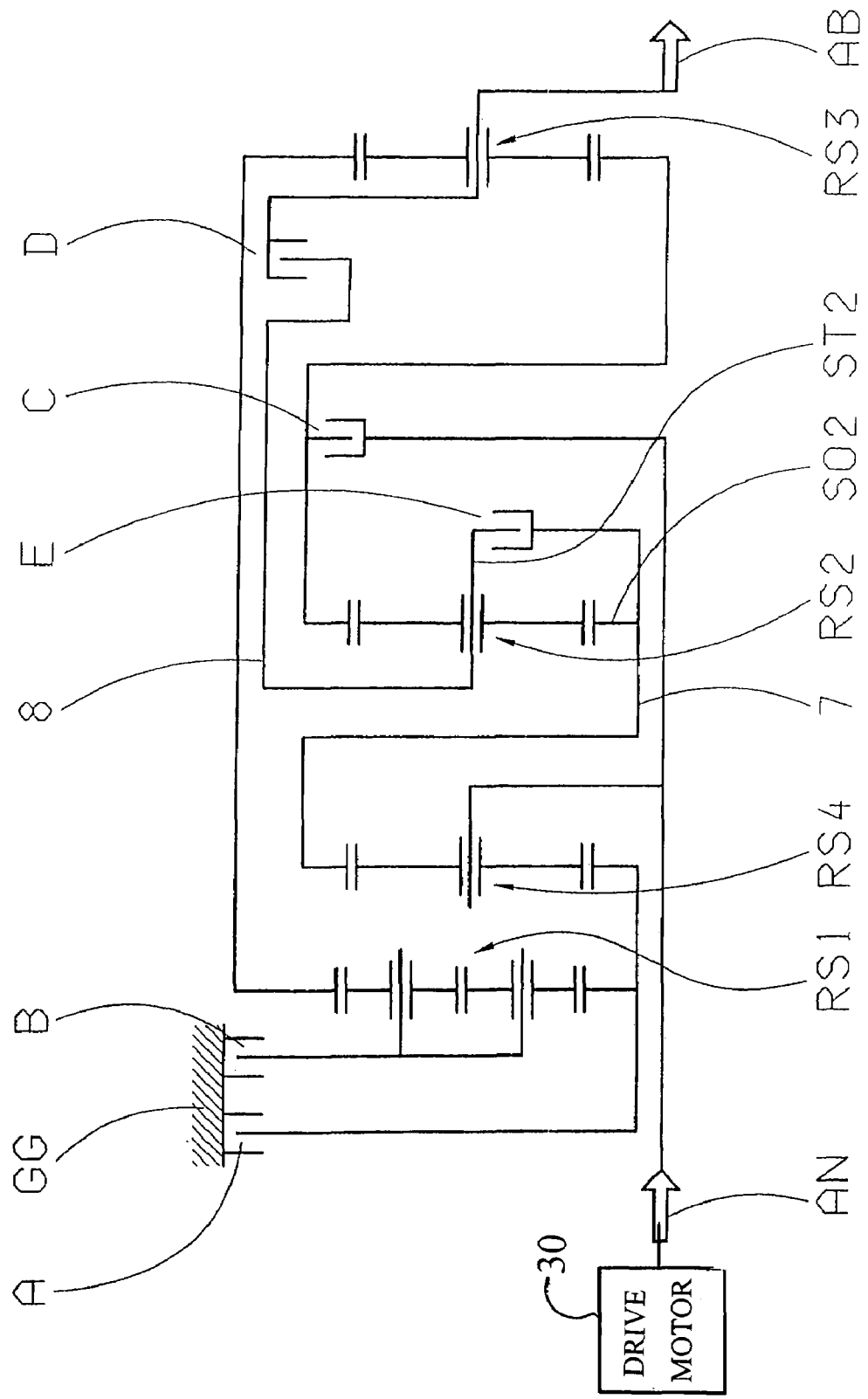
FIG. 2 is a schematic presentation of a second embodiment of a multi-step transmission according to the invention.

Based on the consideration that the clutch E, as the fifth shifting element of the transmission, locks the second planetary gearset RS2 when in engaged state, the following two embodiments of an inventive multi-step transmission present two other possibilities for engaging the aforementioned second planetary gearset RS2 by way of the aforementioned clutch E. FIG. 2 shows a second embodiment and FIG. 3 a third embodiment of an inventive multi-step transmission, again in simplified schematic presentation, both based on the embodiment previously explained in detail on the basis of FIG. 1.

It can be easily seen from FIG. 2 that the only difference between the second embodiment of an inventive multi-step transmission shown here and that of FIG. 1 is that the clutch E is now arranged in the direction of power flow between shaft 7 and shaft 8. In the engaged state, the clutch E now connects the sun gear SO2 and the carrier ST2 of the planetary gearset RS2.

In the embodiment, shown in FIG. 2, the clutch E, axially immediately adjacent to the second planetary gearset RS2, is arranged in spatial terms in an area axially between the second and third planetary gearsets RS2, RS3. The disc set of the clutch E, for example, is thereby arranged on a smaller diameter than the disc set of the adjacent clutch C. For the person skilled in the art, it is obvious that, unlike the presentation in FIG. 2, it can be provided that the disc sets of the two clutches C, E in spatial terms are arranged radially one above the other or that the disc set of the clutch E can be arranged on a larger diameter, or that the disc sets of the two clutches C, E can also be arranged on an at least similar diameter or that the disc sets of the two clutches C, D in spatial terms can be arranged radially one above the other.

It can also be provided, for example, in another embodiment of the transmission that differs from FIG. 2, that the clutch E is arranged, in spatial terms, axially adjacent to the second planetary gearset RS2 in an area axially between the fourth planetary gearset RS4 and the second planetary gearset RS2.

Figure 3:
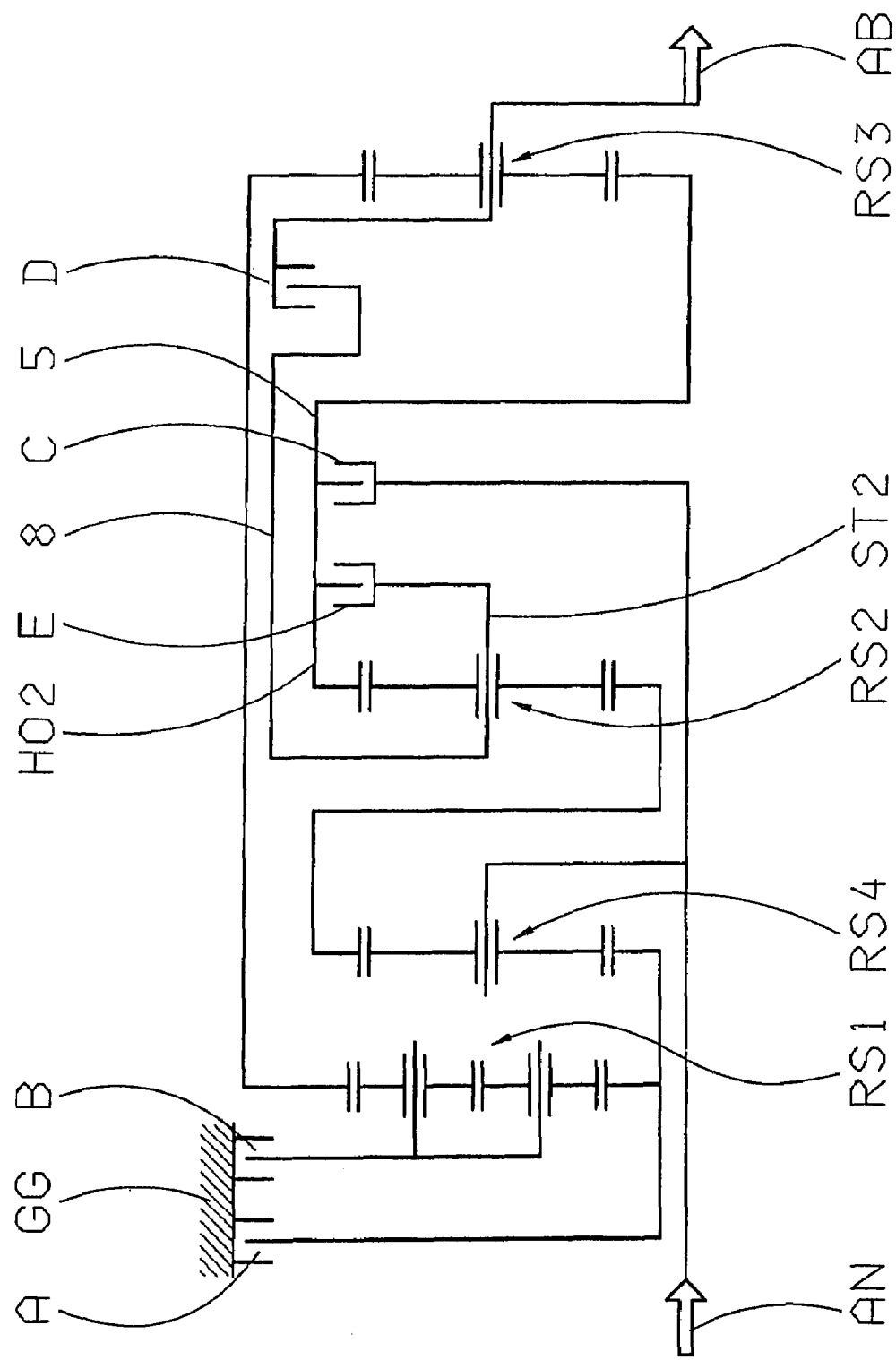
FIG. 3 is a schematic presentation of a third embodiment of a multi-step transmission according to the invention.

It can be easily seen from FIG. 3 that the only difference between the third embodiment of an inventive multi-step transmission, shown here and FIG. 1, is that the clutch E is now arranged in the direction of power flow between the shaft 5 and the shaft 8. In the engaged state, the clutch E now connects the carrier ST2 and the ring gear HO2 of the planetary gearset RS2.

FIG. 4 shows an exemplary shift pattern as it could be provided for the inventive multi-step transmission according to FIGS. 1, 2 and 3. In each gear, three shifting elements are engaged and two shifting elements are disengaged. In addition to the gearshift logic, the shift pattern can also provide exemplary values for a respective ratio i of the individual gear step and a gear step φ to be determined from them. The specified ratio i is derived from the (typical) stationary transmission ratios of the four planetary gearsets RS1, RS2, RS3, RS4 of plus 3.00, minus 1.70, minus 3.70, and minus 2.00. In addition, the shift pattern shows that double shifting or range shifting, can be avoided with sequential shifting, because two adjacent gear ratios in the gearshift logic use two shifting elements in common. The sixth gear is configured as a direct gear.

The first forward gear is obtained by engaging the brakes A and B and the clutch C; the second forward gear by engaging the brakes A and B and the clutch E; the third forward gear by engaging the brake B and the clutches C and E; the fourth forward gear by engaging the brake B and the clutches D and E; the fifth forward gear by engaging the brake B and the clutches C and D; the sixth forward gear by engaging the clutches C, D, and E; the seventh forward gear by engaging the brake A and the clutches C and D; and the eighth forward gear by engaging the brake A and the clutches D and E. As is also shown by the shift pattern, the reverse gear is obtained by engaging brakes A and B and the clutch D.

According to the invention, the motor vehicle can be started with a shifting element integrated into the transmission. In doing so, a shifting element is particularly suited that is required in both the first forward gear and the reverse gear, in this case preferably brake A or brake B. Advantageously, these two brakes A, B are also required in the second forward gear. If the brake B is used as a starting element integrated into the transmission, starting is then even possible in the first five forward gears and in the reverse gear. As can be seen from the shift pattern, the clutch C can also be used as an internal starting element of the transmission for starting in a forward direction and the clutch D for starting in a reverse direction.

Figure 5:
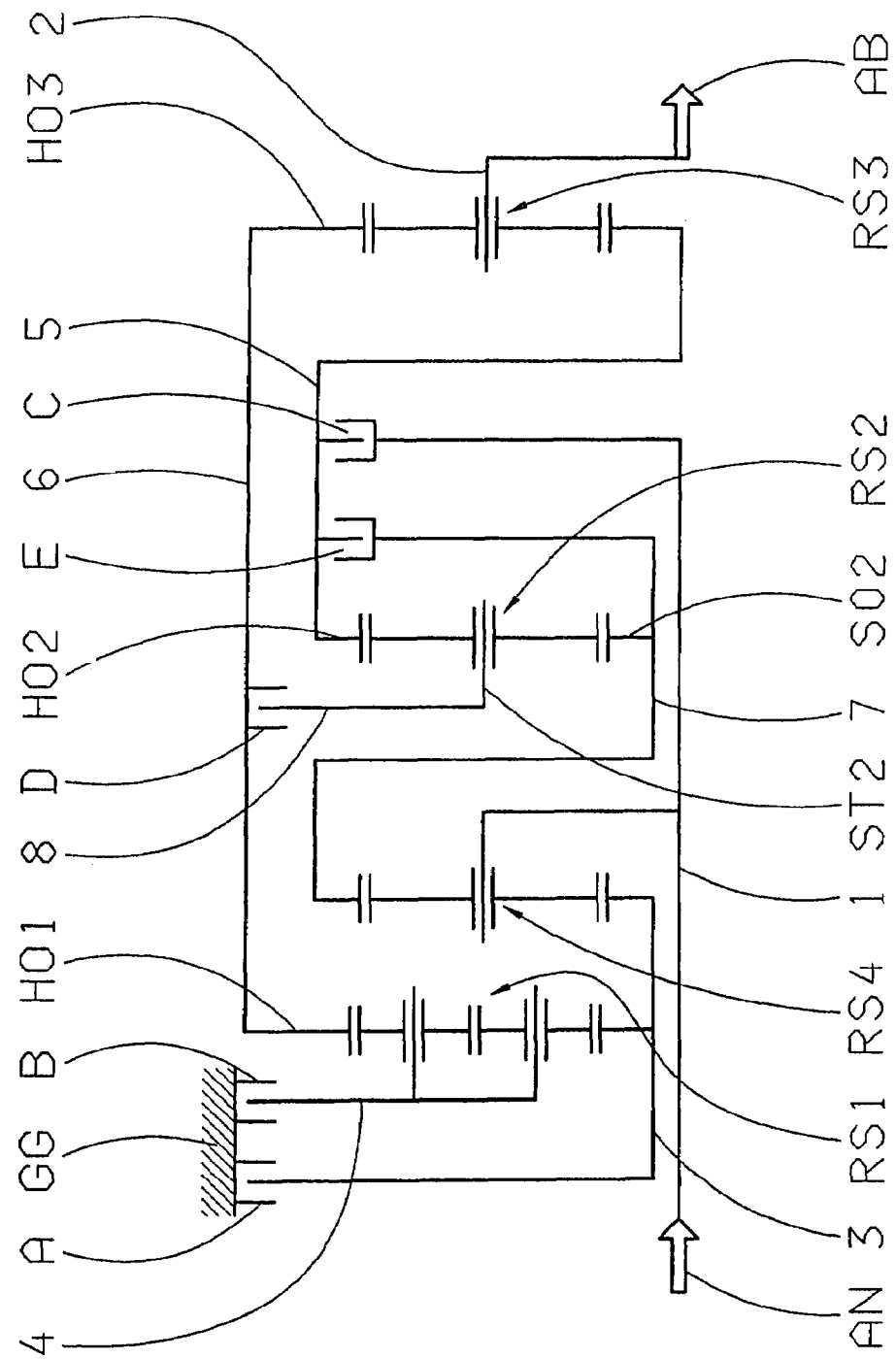
FIG. 5 is a schematic presentation of a fourth embodiment of a multi-step transmission according to the invention.

FIG. 5 shows a schematic presentation of a fourth embodiment of an inventive multi-step transmission, based on the first embodiment that was described in detail using FIG. 1. The only difference, compared to FIG. 1, is the changed kinematic connection of the fourth shifting element D to the planetary gearsets. According to FIG. 5, the clutch D is now arranged in the direction of power flow between the shaft 6 and the shaft 8 of the transmission. In the engaged state, the clutch D now thus connects the carrier ST2 of the second planetary gearset RS2 to the coupling shaft, which permanently connects the two ring gears HO1, HO3 of the first and third planetary gearsets RS1, RS3.

In the embodiment shown in FIG. 5, the clutch D in spatial terms is arranged in an area axially between the fourth and second planetary gearsets RS4, RS2, thereby adjacent to the second planetary gearset RS2. An inner disc carrier of the clutch D is connected to the carrier ST2 of the second planetary gearset RS2 and, therefore, forms a section of shaft 8. Correspondingly, an outer disc carrier of the clutch D forms a section of the shaft 6. If required, the person skilled in the art will modify the spatial position of the disc set of the clutch D shown in FIG. 5. The person skilled in the art will also provide the suitable spatial arrangement of the servo device (not shown in detail in FIG. 5) of the clutch D for actuating the clutch's disc set; for example, the pressure chamber and the pressure compensation space of the servo of the clutch D can be arranged near the third planetary gearset RS3 or in an area axially between the first and fourth planetary gearsets RS1, RS4.

Figure 6:
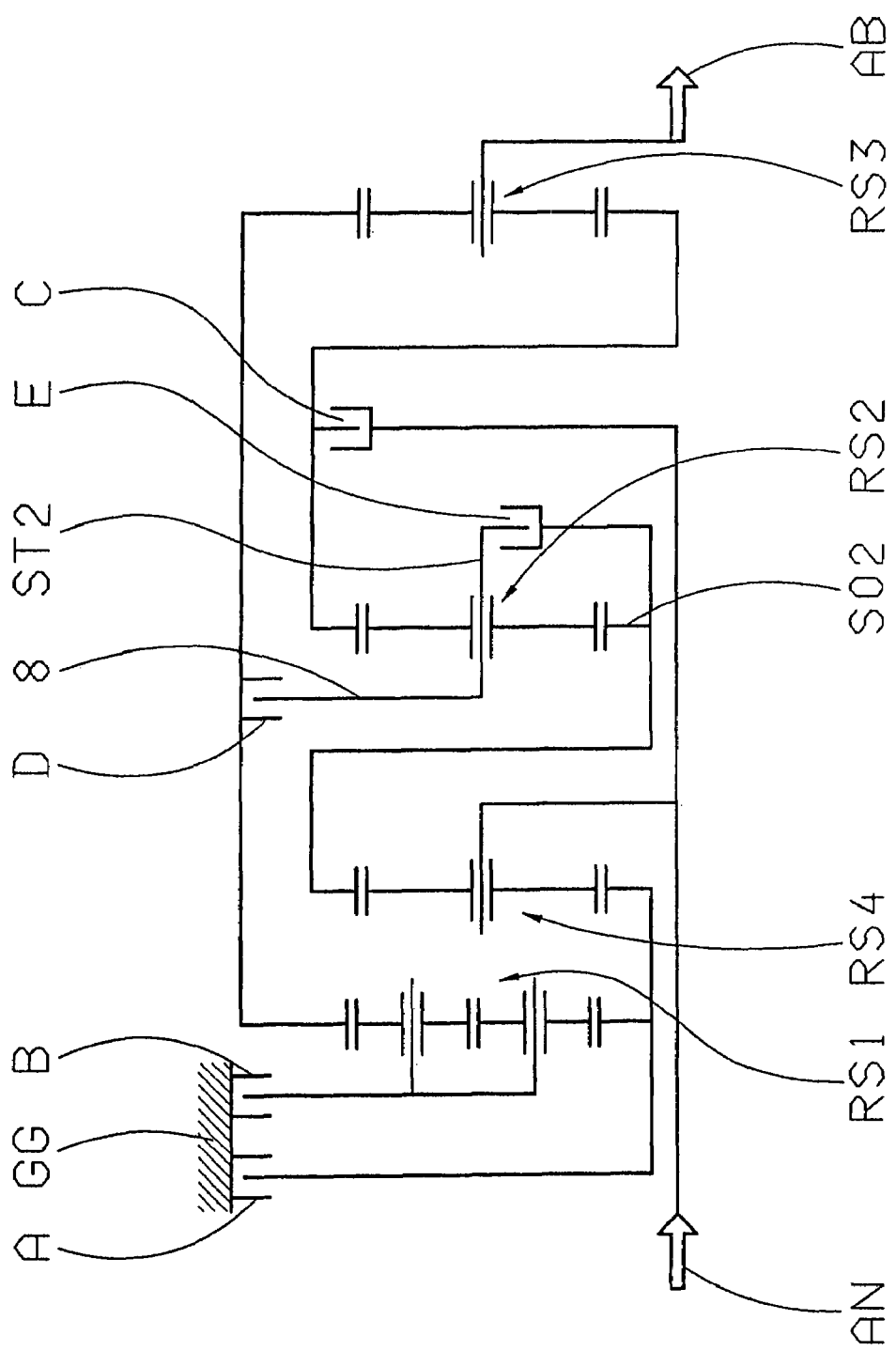
FIG. 6 is a schematic presentation of a fifth embodiment of a multi-step transmission according to the invention.
Figure 7:
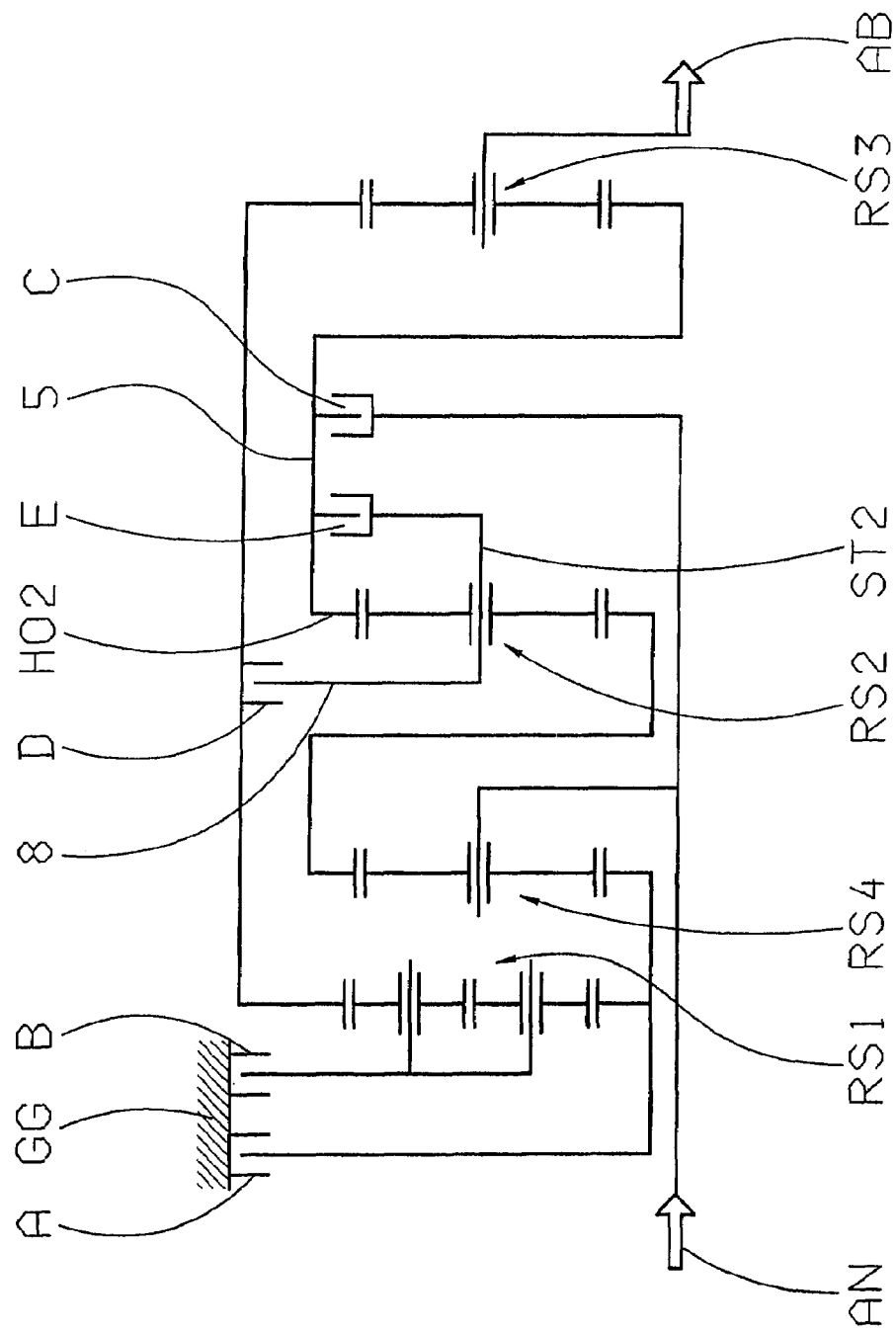
FIG. 7 is a schematic presentation of a sixth embodiment of a multi-step transmission according to the invention.

Based on the consideration that clutch E locks the second planetary gearset RS2 in engaged state, as in FIG. 1, the following two embodiments show two other possibilities to lock the second planetary gearset RS2 by way of the clutch E. FIG. 6 shows a fifth embodiment and FIG. 7 shows a sixth embodiment of an inventive multi-step transmission, again in simplified schematic presentation. Both are based on the fourth embodiment shown in FIG. 5.

It can be easily seen from FIG. 6 that the only difference between the fifth embodiment of an inventive multi-step transmission, shown and that in FIG. 5, is that the clutch E is now arranged in the direction of power flow between shaft 7 and shaft 8. In the engaged state, the clutch E now connects the sun gear SO2 and carrier ST2 of the planetary gearset RS2. The kinematic coupling of clutch E to the second planetary gearset RS2 is, therefore, identical in FIG. 2 and FIG. 6. In that respect, the statements regarding the spatial arrangement of the clutch E, made in connection with FIG. 2, also apply here.

It can be seen from FIG. 7 that the only difference between the sixth embodiment of an inventive multi-step transmission, shown here and that in FIG. 5, is that the clutch E is now arranged in the direction of power flow between shaft 5 and shaft 8. In the engaged state, clutch E now connects the carrier ST2 and the ring gear HO2 of the planetary gearset RS2. The kinematic coupling of the clutch E to the second planetary gearset RS2 is, therefore, identical in FIGS. 3 and 7.

FIG. 8 shows an exemplary shift logic and exemplary gear ratios as they could be provided for the inventive multi-speed transmission according to FIGS. 5, 6 and 7. The specified shift logic thereby corresponds to that of the shift pattern according to FIG. 4. In each gear, three shifting elements are engaged and two shifting elements are disengaged. The exemplary values, specified in FIG. 8, for the respective ratio i of the individual gear ratio and the gear step $\phi$ to be derived from them, in part are in part slightly different from the values shown in FIG. 4 and are obtained on the basis of the (typical) stationary transmission ratios of the four planetary gearsets RS1, RS2, RS3, RS4 of plus 3.00, minus 1.55, minus 3.70 and minus 2.00.

In addition, the following applies to all previously presented described embodiments of an inventive multi-step transmission.

According to the invention, different gear transitions may be obtained, even with the same transmission diagram, depending on the stationary transmission ratios of the individual planetary sets in order to enable variations specific to use or vehicle type.

Figure 14:
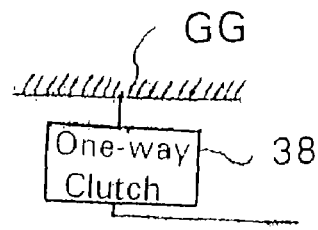
FIG. 14 is a diagrammatic view of an embodiment of the inventive multi-speed transmission having a one-way clutch.

It is also possible, as shown in FIG. 14, to provide additional one-way clutches 38 at any suitable position of the multi-step transmission, for example, between a shaft and the housing or possibly in order to connect two shafts.

Figure 9:
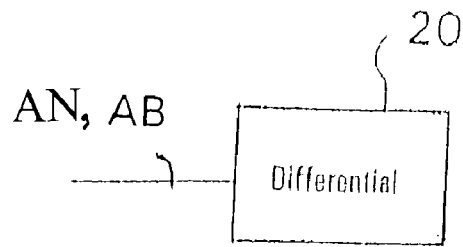
FIG. 9 is a diagrammatic view of an embodiment of the inventive multi-speed transmission having a differential.

An axle differential 20 and/or a distributor differential can be arranged on the input or the output sides, as shown in FIG. 9.

Figure 10:
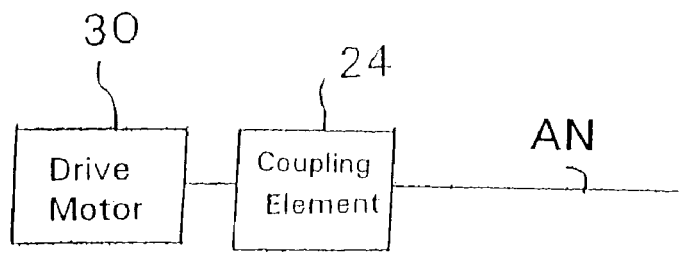
FIG. 10 is a diagrammatic view of an embodiment of the inventive multi-speed transmission with a coupling element and a drive motor.
Figure 11:
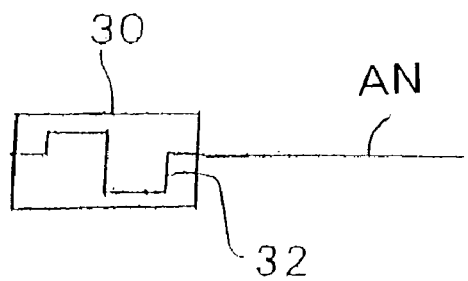
FIG. 11 is a diagrammatic view of an embodiment of the inventive multi-speed transmission with a crankshaft of the drive motor fixed to an input shaft of the multi-speed transmission.
Figure 18:
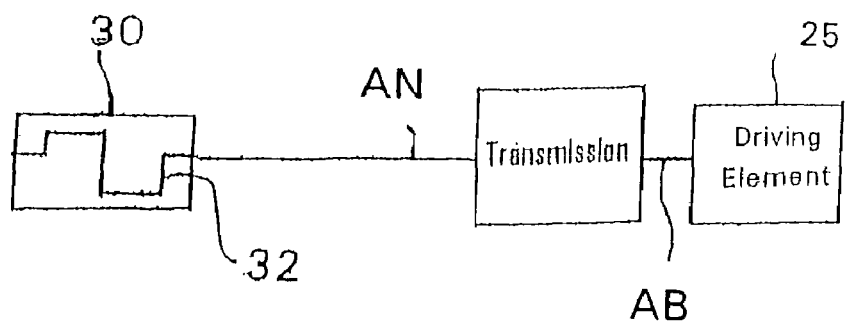
FIG. 18 is a diagrammatic view of another embodiment of the inventive multi-speed transmission with the crankshaft of the drive motor fixed to the input shaft of the multi-speed transmission and the coupling element located behind the multi-speed transmission.

As part of a further embodiment, as shown in FIG. 10, the input shaft AN can be separated from a drive motor 30, if required, by way of a coupling element 24, whereby a hydrodynamic converter, a hydraulic clutch, a dry starting clutch, a wet starting clutch, a magnetic particle clutch, or a centrifugal clutch can be used as this kind of coupling element. It is also possible, as shown in FIG. 18, to arrange such a driving element 25 behind the transmission in the direction of the power flow where, in this case, the input shaft AN is permanently connected with the crankshaft 32 of the drive motor 30 and shown in FIG. 11.

Figure 12:
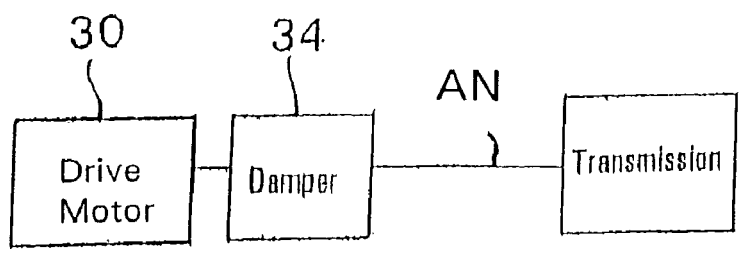
FIG. 12 is a diagrammatic view of an embodiment of the inventive multi-speed transmission having the drive motor communicating with a damper.

In addition, the inventive multi-step transmission, as shown in FIG. 12, also enables the arrangement of a torsional vibration damper between the drive motor and the transmission.

Figure 13:
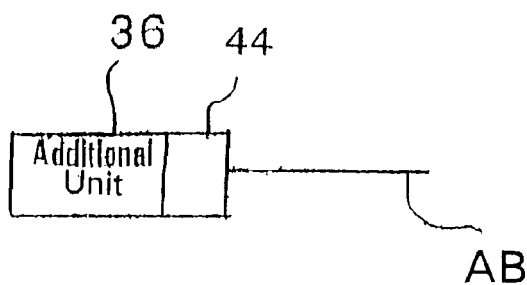
FIG. 13 is a diagrammatic view of an embodiment of the inventive multi-speed transmission with a power take-off for driving an additional unit.
Figure 16:
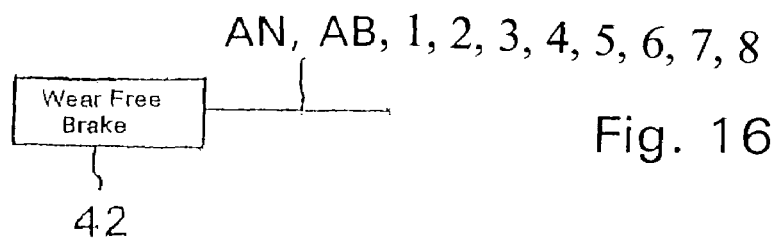
FIG. 16 is a diagrammatic view of a preferred design of the inventive multi-speed transmission having a wear free brake.
Figure 17:
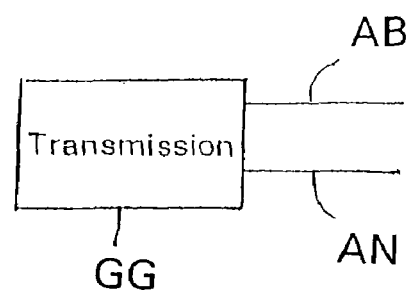
FIG. 17 is a diagrammatic view of a further embodiment of the invention with the input and the output being provided on the same side of the multi-speed transmission housing.

As part of an additional embodiment of the invention, shown in FIG. 16, a wear-free brake 42, such as a hydraulic or electric retarder, for example, or a similar device, can be arranged on each shaft, preferably on the input shaft AN or the output shaft AB. This is particularly important for use in commercial motor vehicles. In addition, a power take-off 44 can be provided, as shown in FIG. 13, for driving additional units on each shaft, preferably on the input shaft AN or the output shaft AB. Additionally, as shown in FIG. 17, the input and output are provided on the same side of the housing GG.

The shifting elements used can be configured as powershift clutches or powershift brakes. In particular, frictional-locking brakes or friction-locking clutches can be used, such as disc clutches, band brakes and/or conical clutches, for example. In addition, as control elements, positive brakes and/or positive clutches can be used, such as synchronizations or claw couplings.

Figure 15:
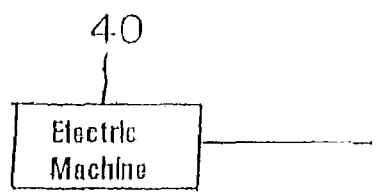
FIG. 15 is a diagrammatic view of an embodiment of the inventive multi-speed transmission with an electric machine.

A further advantage of the multi-step transmission presented here in FIG. 15, is that an electric machine 40 can be attached to each shaft as a generator and/or an additional drive unit.

Of course, every constructive design, in particular any spatial arrangement of the planetary gearsets and the shifting elements as such and in relation to each other, and as far as technically reasonable, falls under the scope of protection of the present claims, without affecting the function of the transmission as specified in the claims, even when these designs are not explicitly presented in the Figures or the description.

REFERENCE NUMERALS 1 first shaft
2 second shaft
3 third shaft
4 fourth shaft
5 fifth shaft
6 sixth shaft 7 seventh shaft
8 eighth shaft
A first shifting element, first brake
B second shifting element, second brake
C third shifting element, first clutch
D fourth shifting element, second clutch
E fifth shifting element, third clutch
AB output shaft
AN input shaft
GG housing
RS1 first planetary gearset
HO1 ring gear of the first planetary gearset
SO1 sun gear of the first planetary gearset
ST1 carrier of the first planetary gearset
PL1i inner planetary gears of the first planetary gearset
PL1a a outer planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i ratio
φ gear step

The invention claimed is:

1. A multi-speed automatic transmission of a planetary design for a motor vehicle, the transmission comprising:
an input shaft (AN) and an output shaft (AB);
first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;
at least first, second, third, fourth, fifth, sixth, seventh and eighth rotatable shafts (1, 2, 3, 4, 5, 6, 7, 8); and
first, second, third, fourth and fifth shifting elements (A, B, C, D, E) whose selective engagement creates different gear ratios between the input shaft (AN) and the output shaft (AB) so that eight forward gears and at least one reverse gear can be implemented;
wherein the carrier (ST4) of the fourth planetary gearset (RS4) and the input shaft (AN) are permanently connected and form the first shaft (1);
the carrier (ST3) of the third planetary gearset (RS3) and the output shaft (AB) are permanently connected and form the second shaft (2);
the sun gear (SO1) of the first planetary gearset (RS1) and the sun gear (SO4) of the fourth planetary gearset (RS4) are permanently connected and form the third shaft (3);
the ring gear (HO2) of the second planetary gearset (RS2) and the sun gear (SO3) of the third planetary gearset (RS3) are permanently connected and form the fifth shaft (5);
the sun gear (SO2) of the second planetary gearset (RS2) and the ring gear (HO4) of the fourth planetary gearset (RS4) are permanently connected and form the seventh shaft (7);
the carrier (ST2) of the second planetary gearset (RS2) forms the eighth shaft (8);
the carrier (ST1) of the first planetary gearset (RS1) forms the fourth shaft (4);
the ring gear (HO1) of the first planetary gearset (RS1) and the ring gear (HO3) of the third planetary gearset (RS3) are permanently connected and form the sixth shaft (6);
the first shifting element (A) is arranged between the third shaft (3) and a transmission housing (GG);
the second shifting element (B) is arranged between the fourth shaft (4) and the transmission housing (GG);
the third shifting element (C) is arranged, in a direction of the power flow, between the first shaft (1) and the fifth shaft (5);
the fourth shifting element (D) is arranged, in the direction of the power flow, between one of the second shaft (2) and the eighth shaft (2, 8) and the sixth shaft (6) and the eighth shaft (8); and
the fifth shifting element (E) is arranged, in the direction of the power flow, between one of the fifth shaft (5) and the seventh shaft (7), the fifth shaft (5) and the eighth shaft (8), and the seventh shaft (7) and the eighth shaft (7, 8).

2. The multi-step transmission according to claim 1, wherein
a first forward gear results from engagement of the first shifting element (A), the second shifting element B, and the third shifting element (C);
a second forward gear results from engagement of the first shifting element (A), the second shifting element (B), and the fifth shifting element (E);
a third forward gear results from engagement of the second shifting element (B), the third shifting element (C), and the fifth shifting element (E);
a fourth forward gear results from engagement of the second shifting element (B), fourth shifting element (D), and fifth shifting element (E);
a fifth forward gear results from engagement of the second shifting element (B), the third shifting element (C), and the fourth shifting element (D);
a sixth forward gear results from engagement of the third shifting element (C), the fourth shifting element (D), and the fifth shifting element (E);
a seventh forward gear results from engagement of the first shifting element (A), the third shifting element (C), and the fourth shifting element (D);
an eighth forward gear results from engagement of the first shifting element (A), the fourth shifting element (D), and the fifth shifting element (E), and
the reverse gear results from engagement of the first shifting element (A), the second shifting element (B), and the fourth shifting element (D).

3. The multi-step transmission according to claim 1, wherein the second planetary gearset (RS2), the third planetary gearset (RS3) and the fourth planetary gearset (RS4), are negative-planetary gearsets, and the first planetary gearset (RS1) is a positive-planetary gearset.

4. The multi-step transmission according to claim 1, wherein the first planetary gearset (RS1), the second planetary gearset (RS2), the third planetary gearset (RS3) and the fourth planetary gearset (RS4) are co-axial and arranged, in an axial direction, in a sequential order of:
the first planetary gearset (RS1), the fourth planetary gearset (RS4), the second planetary gearset (RS2), and the third planetary gearset (RS3).

5. The multi-step transmission according to claim 1, wherein the input shaft (AN) is axially parallel to the output shaft (AB), and the first planetary gearset (RS1) is located on a side of the transmission housing (GG) adjacent to a drive motor (30) which is connected to the input shaft (AN) of the transmission.

6. The multi-step transmission according to claim 1, wherein the input shaft (AN) is co-axial with the output shaft (AB), and the first planetary gearset (RS1) is located on a side of the transmission housing (GG) adjacent a drive motor (30) which is connected to the input shaft (AN).

7. The multi-step transmission according to claim 1, wherein no more than one shaft of the transmission passes, in an axial direction, through a center of each of the first planetary gearset (RS1), the second planetary gearset (RS2), the third planetary gearset (RS3) and the fourth planetary gearset (RS4).

8. The multi-step transmission according to claim 7, wherein only the first shaft (1) transverses, in the axial direction, a center of each of up to three of the first planetary gearset (RS1), the second planetary gearset (RS2), the third planetary gearset (RS3) and the fourth planetary gearset (RS4).

9. The multi-step transmission according to claim 1, wherein a hub rotationally supports the third shaft (3) and is fixed to the transmission housing (GG).

10. The multi-step transmission according to claim 1, wherein at least one of the first shifting element (A) and the second shifting element (B) is located, in spatial terms, at least partially in an area radially above one of the first planetary gearset (RS1) and the fourth planetary gearset (RS4).

11. The multi-step transmission according to claim 1, wherein the first shifting element (A) is arranged, in spatial terms, axially parallel the second shifting element (B), and at least one friction element of the second shifting element (B) located is closer to the fourth planetary gearset (RS4) than a friction element of the first shifting element (A).

12. The multi-step transmission according to claim 1, wherein one of the first shifting element (A) is at least partially located, in spatial terms, radially above the second shifting element (B) and the second shifting element (B) is at least partially located, in spatial terms, radially above the first shifting element (A).

13. The multi-step transmission according to claim 1, wherein the fifth shifting element (E), in spatial terms, is adjacent the second planetary gearset (RS2).

14. The multi-step transmission according to claim 1, wherein the fifth shifting element (E) is axially located, at least partially, between the fourth planetary gearset (RS4) and the second planetary gearset (RS2).

15. The multi-step transmission according to claim 1, wherein the fifth shifting element (E) is axially located, at least partially, between the second planetary gearset (RS2) and the third planetary gearset (RS3).

16. The multi-step transmission according to claim 1, wherein the third shifting element (C) is axially located, at least partially, between the second planetary gearset (RS2) and the third planetary gearset (RS3).

17. The multi-step transmission according to claim 15, wherein the third shifting element (C) is arranged at least substantially axially parallel the fifth shifting element (E), and a disc set of the third shifting element (C) is closer to the third planetary gearset (RS3) than a disc set of the fifth shifting element (E).

18. The multi-step transmission according to claim 15, wherein one of a disc set of the third shifting element (C) is located, at least partially, radially above a disc set of the fifth shifting element (E) and the disc set of the fifth shifting element (E) is located, at least partially, radially above the disc set of the third shifting element (C).

19. The multi-step transmission according to claim 1, wherein the fourth shifting element (D) is axially arranged, in spatial terms, at least partially between the second planetary gearset (RS2) and the third planetary gearset (RS3).

20. The multi-step transmission according to claim 1, wherein the fourth shifting element (D) is axially arranged, in spatial terms, at least partially between the fourth planetary gearset (RS4) and the second planetary gearset (RS2).

21. The multi-step transmission according to claim 1, wherein a disc set of the fourth shifting element (D) is adjacent the second planetary gearset (RS2).

22. The multi-step transmission according to claim 1, wherein a disc set of the fourth shifting element (D) is adjacent the third planetary gearset (RS3).

23. The multi-step transmission according to claim 1, wherein the sixth shaft (6), in an axial direction, completely overlies the fourth planetary gearset (RS4), the second planetary gearset (RS2), the third shifting element (C) and the fifth shifting element (E).

24. The multi-step transmission according to claim 1, wherein the sixth shaft (6), in an axial direction, completely overlies the fourth planetary gearset (RS4), the second planetary gearset (RS2), the third shifting element (C), the fourth shifting element (D), and the fifth shifting element (E).

25. The multi-step transmission according to claim 1, wherein at least one one-way clutch is located between at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) and the transmission housing (GG).

26. The multi-step transmission according to claim 1, wherein an input and an output of the transmission are provided on opposite sides of the housing (GG).

27. The multi-step transmission according to claim 1, wherein an input and an output of the transmission are located on a common side of the housing (GG).

28. The multi-step transmission according to claim 1, wherein at least one of an axle differential and a distributor differential is located on one of the input shaft (AN) and the output shaft (AB).

29. The multi-step transmission according to claim 1, wherein an coupling element is located, in a direction of power flow, between a drive motor (30) of the motor vehicle and the input shaft (AN), and the coupling element is one of a hydrodynamic converter, a hydraulic clutch, a dry starting clutch, a wet starting clutch, a magnetic-power clutch and a centrifugal clutch.

30. The multi-step transmission according to claim 1, wherein the vehicle starts via one of the first shifting element (A), the second shifting element (B), the third shifting element (C) and the fourth shifting element (D) of the transmission, and the input shaft (AN) is permanently connected to a crankshaft of a drive motor (30) via one of a rotationally fixed manner and a rotationally elastic manner.

31. The multi-step transmission according claim 30, wherein starting of the vehicle in a forward direction and a reverse direction occurs via engagement of one of the first shifting element (A) and the second shifting element (B).

32. The multi-step transmission according to claim 1, wherein one of a wear free brake, a power take-off for driving an additional unit, and an electric machine is secured to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

33. The multi-step transmission according to claim 1, wherein each of the first shifting element (A), the second shifting element (B), the third shifting element (C), the fourth shifting element (D) and the fifth shifting element (E) is one of a friction-lock clutch, a friction-lock brake, a disc clutch, a band brake and a conical clutch, a form-locking clutch, a form-locking brake, a conical clutch and a claw clutch.

* * * * *